United States Patent
Sawai (10) Patent No.: US 8,061,855 B2
(45) Date of Patent: Nov. 22, 2011

(54) PROJECTION APPARATUS

(75) Inventor: Yasumasa Sawai, Yamatotakada (JP)

(73) Assignee: Konica Minolta Opto, Inc., Hachioji-shi (JP)

(*) Notice: Subject to any disclaimer, the term of this patent is extended or adjusted under 35 U.S.C. 154(b) by 415 days.

(21) Appl. No.: 12/337,885

(22) Filed: Dec. 18, 2008

(65) Prior Publication Data

US 2009/0168041 A1 Jul. 2, 2009

(30) Foreign Application Priority Data

Dec. 27, 2007 (JP) ................. 2007-336184

(51) Int. Cl.
*G03B 21/14* (2006.01)
*G02B 6/10* (2006.01)
*F21V 7/04* (2006.01)

(52) U.S. Cl. ............................ 353/97; 385/146; 362/551

(58) Field of Classification Search .................. 353/97; 355/71; 362/551; 385/34, 133, 146
See application file for complete search history.

(56) References Cited

U.S. PATENT DOCUMENTS

| | | | | |
|---|---|---|---|---|
| 5,519,518 A | * | 5/1996 | Watanabe et al. | 349/57 |
| 5,978,051 A | * | 11/1999 | Gohman et al. | 348/766 |
| 6,789,931 B2 | | 9/2004 | Pinho | 362/551 |
| 6,868,223 B2 | | 3/2005 | Shinoda | 385/146 |

FOREIGN PATENT DOCUMENTS

| JP | 05-188345 A | | 7/1993 |
|---|---|---|---|
| JP | 11-176221 A | | 7/1999 |
| JP | 2003-100622 A | | 4/2003 |
| JP | 2009159163 A | * | 7/2009 |

* cited by examiner

*Primary Examiner* — Georgia Y Epps
*Assistant Examiner* — Danell L Owens
(74) *Attorney, Agent, or Firm* — Sidley Austin LLP (57) ABSTRACT

A projection apparatus including an image display element for modulating illumination light, an illumination optical system for irradiating the illumination light onto the image display element, a projection optical system for projecting the modulated light by the image display element onto a projection surface, and an optical system changing section for changing the illumination optical system, wherein the illumination optical system includes a light source, a condensing optical system, a rod integrator and an illumination relay optical system wherein the projection optical system includes a projection variable-aperture diaphragm whose aperture diameter can be adjusted, and wherein the optical system changing section changes, when the aperture diameter of the projection variable-aperture diaphragm is made smaller, the illumination optical system such that an amount of light passing through the projection variable-aperture diaphragm with that aperture diameter increases.

20 Claims, 10 Drawing Sheets

PROJECTION APPARATUS

This application is based on Japanese Patent Application No. 2007-336184 filed on Dec. 27, 2007, in Japanese Patent Office, the entire content of which is hereby incorporated by reference.

TECHNICAL FIELD

A present invention relates to a projection apparatus, which can be used for a projector for home theaters.

BACKGROUND

In recent years, a projection apparatus that projects illumination light modulated by an image display element, such as a liquid crystal and a digital micromirror device (hereinafter also referred to as "DMD"), on a surface to be projected, such as a screen, has become widely used as a projector for home theaters.

This kind of projection apparatus usually includes an image display element for modulating illumination light, an illumination optical system for irradiating the image display element with the illumination light, and a projection optical system for projecting the light modulated by the image display element onto a projection surface.

In this projection apparatus, brightness and contrast of a projection image, which is projected on a screen, are affected by the state of an aperture diaphragm of the above-mentioned projection optical system. To be more specific, when an aperture diameter of the aperture diaphragm provided in the projection optical system is larger, the projection image becomes brighter, but the contrast is lower. Conversely, when the aperture diameter of the aperture diaphragm is smaller, the projection image becomes darker, but the contrast is higher.

Therefore, a projection apparatus whose projection optical system is provided with a variable-aperture diaphragm whose aperture diameter can be adjusted so that the brightness and the contrast of the projection image can be adjusted depending on the image to be displayed (for example, refer to Laid-Open Japanese Patent Application Publication No. H05-188345).

On the other hand, a discharge lamp with a large amount of light per unit area is preferably used as a light source for the above-mentioned illumination optical system. However, a parallel light, which is generated by collimating the light from the discharge lamp, does not have an even spatial light intensity distribution, and the light intensity in the area near an optical axis is smaller than in the circumferential area.

Therefore, an illumination optical system using a rod integrator for flattening the spatial light intensity distribution of the illumination light has been proposed (for example, refer to U.S. Pat. No. 6,868,223 and a U.S. Pat. No. 6,789,931).

As mentioned above, the brightness and contrast of the projection image, which is projected on a screen, have a so-called trade-off relationship. Therefore, when projecting using the projection apparatus disclosed in Laid-Open Japanese Patent Application Publication No. H05-188345, there was a problem that the brightness fell when the aperture diameter of the variable-aperture diaphragm of the projection optical system was made smaller to obtain high contrast.

Even when the illumination optical system using the rod integrator disclosed in the U.S. Pat. No. 6,868,223 and in the U.S. Pat. No. 6,789,931 is used as an illumination optical system of the projection apparatus to flatten the light intensity distribution, there is a problem that the decrease of the brightness caused by making the aperture diameter of the variable-aperture diaphragm of the projection optical system smaller could not be controlled.

In particular, in the case of the projection apparatus in which the discharge lamp is used as a light source, since the amount of light in the area near to an optical axis was especially small, the above-mentioned problem is particularly significant.

The present invention has been made to solve the above technical problems. An objective of the present invention is to provide a projection apparatus which is provided with the variable-aperture diaphragm and can control the decrease of the brightness at the time of making the aperture diameter of the variable-aperture diaphragm smaller, and which can obtain good projection images with a high contrast.

SUMMARY

In view of forgoing, one embodiment according to one aspect of the present invention is a projection apparatus, comprising:
  an image display element for modulating illumination light;
  an illumination optical system for irradiating the image display element with the illumination light;
  a projection optical system for projecting the illumination light modulated by the image display element onto a projection surface, the projection optical system including:
    a projection variable-aperture diaphragm having an aperture whose aperture diameter is variable;
  an optical system changing section for changing the illumination optical system based on the aperture diameter of the projection variable-aperture diaphragm,
  wherein the optical system changing section changes the illumination optical system when the aperture of the projection variable-aperture diaphragm changes from a first size to a second size smaller than the first size, so that an amount of light which pass through an area corresponding to the aperture of the second size is greater than before changing the illumination optical system.

According to another aspect of the present invention, another embodiment is a projection apparatus, comprising:
  an image display element for modulating illumination light;
  an illumination optical system which included an optical element and is adapted to irradiate the image display element with the illumination light;
  a projection optical system for projecting the illumination light modulated by the image display element onto a projection surface, the projection optical system including:
    a projection variable-aperture diaphragm having an aperture whose aperture diameter is variable;
  an illumination optical system changing mechanism for changing a position or a configuration of the optical element depending on the aperture diameter of the projection variable-aperture diaphragm.

DETAILED DESCRIPTION OF THE PREFERRED EMBODIMENT

Hereafter, embodiments of the present invention will be described in detail with reference to FIGS. 1-10.

First Embodiment of the Present Invention

Figure 1:
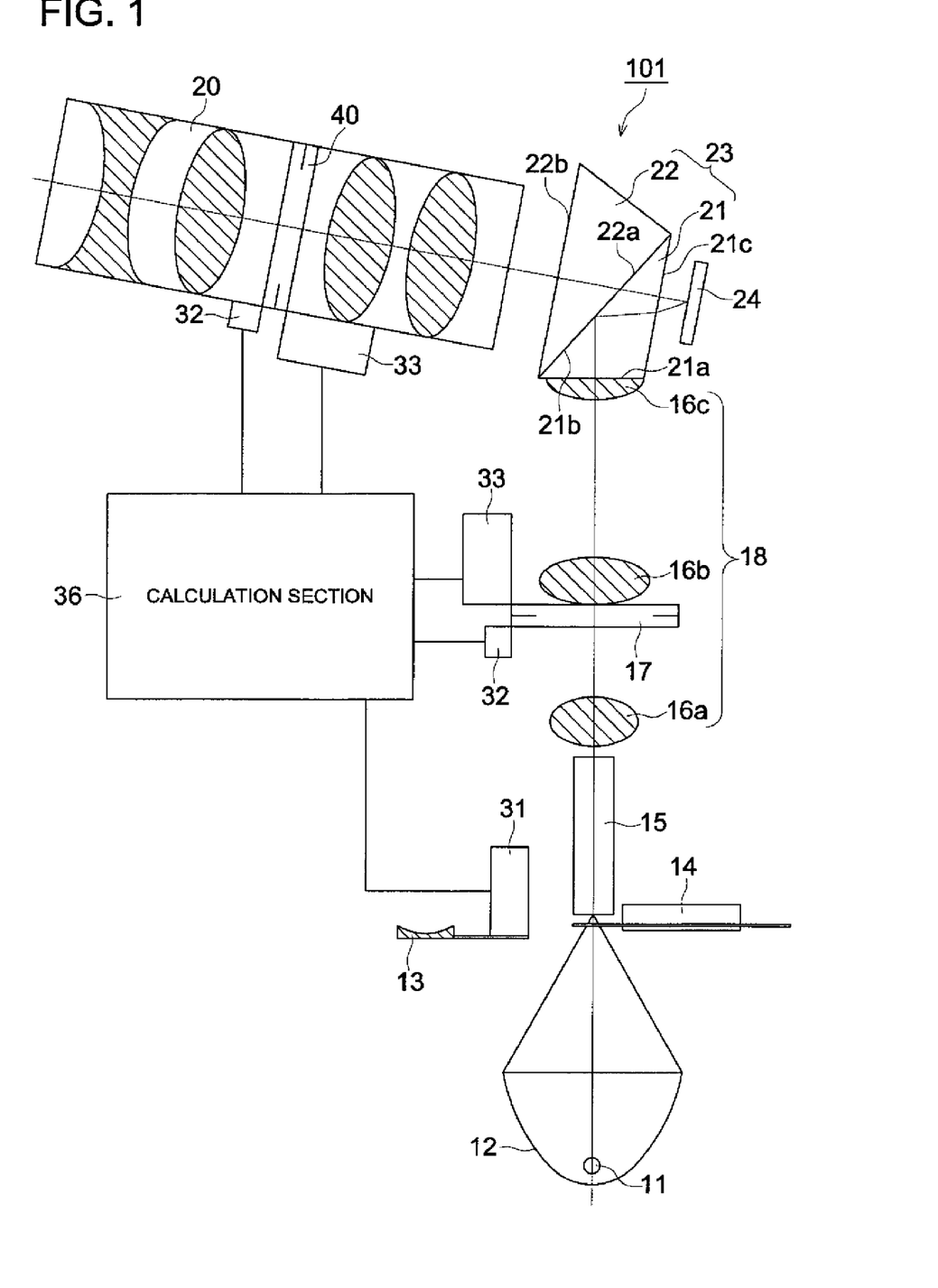
FIG. 1 is a block diagram of a projection apparatus 101 (with a concave lens 13 in an evacuated state) of a first embodiment of the present invention.
Figure 2:
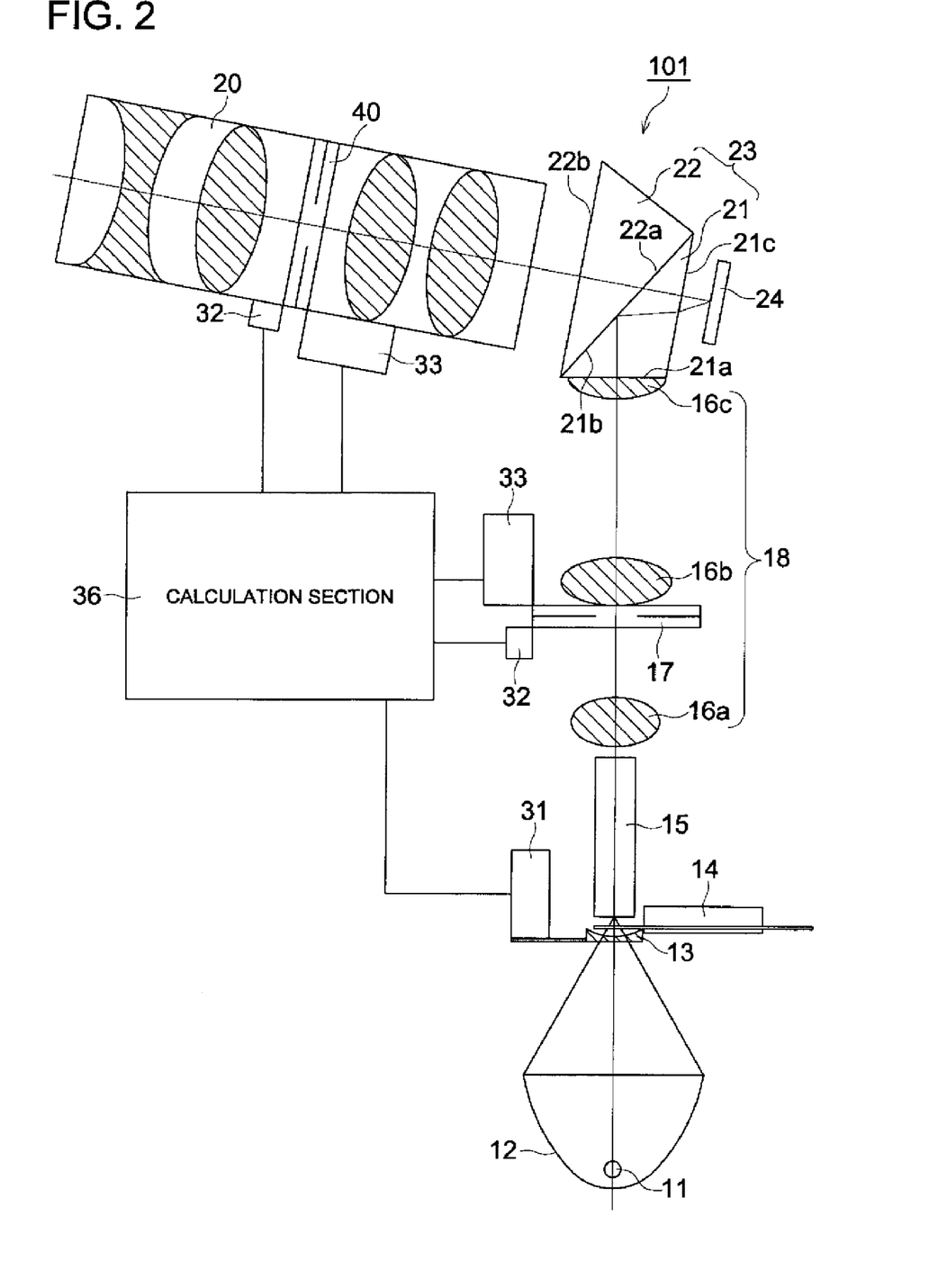
FIG. 2 is a block diagram of the projection apparatus 101 (with the concave lens 13 in an inserted state) of the first embodiment of the present invention.

A first embodiment of a projection apparatus of the present invention is described with reference to FIGS. 1-6. FIGS. 1 and 2 are block diagrams of a projection apparatus 101 of the first embodiment of the present invention. FIG. 1 shows a state in which an aperture diameter of a projection variable-aperture diaphragm 40 is enlarged. FIG. 2 shows a state in which the aperture diameter of the projection variable-aperture diaphragm 40 is decreased and an illumination optical system is changed with a concave lens 13 located in front of a rod integrator 15.

First, the configuration of the projection apparatus 101 is described with reference to FIG. 1. The projection apparatus 101 includes an image display element (DMD 24) for modulating illumination light, an illumination optical system for irradiating the image display element with the illumination light, and a projection optical system 20 for projecting the light modulated by the image display element on a projection surface.

The illumination optical system is configured of a light source (discharge lamp 11), a condensing optical system (lamp reflector 12) for condensing the light emitted from the light source, a rod integrator 15 for improving the uniformity of the spatial light intensity distribution, of the light condensed by the condensing optical system and entered from an incident surface, before emitting the light from an exit surface, and an illumination relay optical system 18 for guiding the light emitted from the exit surface of the rod integrator onto the image display element.

The discharge lamp 11, which emits white light and has a large light intensity per unit area, is preferably used as a light source. The discharge lamp 11 is not particularly limited to a certain type. The discharge lamp 11 can be chosen and used arbitrarily from light source lamps generally used in projection apparatuses, such as ultra-high pressure mercury lamps and metal halide lamps.

The lamp reflector 12, which functions as the condensing optical system, includes a reflection surface with an elliptical surface, and the discharge lamp 11 is arranged at the focal point. Therefore, a light flux from the discharge lamp 11 is emitted to be a converging light and enters into a color wheel 14. Alternatively, another configuration may be employed in which a lamp reflector with a paraboloidal surface and a condenser lens are used to convert parallel light emitted from the lamp reflector into converging light.

The color wheel 14 is configured of three color filters of each different color, each of which filters transmits light of each of the three wavelengths R (red), G (green), and B (blue). Since the color of the illumination light changes one after another in terms of time in accordance with rotation of the color wheel 14, the projection image can be colorized by alternately displaying the image information corresponding to each color onto the DMD 24. The color filter is not limited to the combination of the three colors R, G, and B. For example, other combination, which can display a color image, such as a combination of three colors C (cyan), M (magenta), and Y (yellow), may be used for the color filters. The color wheel 14 is omissible in the case of a projection apparatus of a monochrome image, and in the case of a form of a projection apparatus in which a set of a DMD 24 and an illumination optical system is provided for each color.

The light flux that has passed through the color wheel 14 enters the rod integrator 15. The light flux that entered the rod integrator 15 is stirred by repeated reflections on the wall surface. The uniformity of the spatial light intensity distribution is already improved at the exit surface of the rod integrator 15. An illumination with a high uniformity is realized by forming a plurality of secondary light source images in an illumination relay optical system 18 depending on a number of reflections in the rod integrator 15 and thereby illuminating DMD 24 with a plurality of overlapped secondary light source images.

The illumination relay optical system 18, a prism unit 23 and the DMD 24 are located behind the rod integrator 15. The light having exited from the rod integrator 15 illuminates the DMD 24 through the illumination relay optical system 18.

The illumination relay optical system 18 is configured of three lenses 16a, 16b and 16c, and an illumination variable-aperture diaphragm 17. In this embodiment of the present invention, the illumination relay optical system 18 cooperate with the prism unit 23 to guide the light emitted from the exit surface of the rod integrator 15 onto the DMD 24. The exit surface of the rod integrator 15 and a display surface of the DMD 24 are conjugated with each other. Illumination can be efficiently performed by making a shape of the exit surface of the rod integrator 15 be approximately similar to that of the display area of the DMD 24.

The DMD 24, which is an image display element of a reflection type, has a display surface with a number of micromirrors arranged thereon in a matrix, where one micromirror constitutes one pixel of the display image. The driving of the inclination of each micromirror is controlled individually, and each micromirror is selectively set to any one of two inclination states of an ON state and an OFF state. When the micromirror is in the ON state, the illumination light reflects towards the projection optical system 20. When the micromirror is in the OFF state, the illumination light reflects in the direction in which the illumination light does not go into the projection optical system 20. Therefore, only the light reflected by the micromirror in the ON state reaches the screen through the projection optical system 20, and an objective image is displayed on the screen.

A major cause of the decrease in contrast, when the DMD 24 is used as the image display element, is scattering on the surface of the display surface of the DVD 24. The configuration is arranged in a manner such that the light reflected by the micromirror does not go into the projection optical system 20 in the case of displaying black color (OFF state). However, there is a component contributing the scattering such as edges of the micromirror, and the scattering light generated there will enter the projection optical system 20 to reach the screen, and thereby raising a black level. This kind of scattering light can effectively be reduced by stopping down the variable aperture diaphragm 40 of the projection optical system 20. Therefore, when the DMD 24 is used as the image display element, it is effectively improves the contrast to make the aperture diameter of the variable aperture diaphragm 40 of the projection optical system 20 smaller.

The prism unit 23 is configured of two prisms, which are a first prism 21 and a second prism 22. The first prism 21 includes a first incident surface 21a, a critical surface 21b and a first exit surface 21c. The second prism 22 includes a second incident surface 22a and a second exit surface 22b. The critical surface 21b of the first prism 21 and the second incident surface 22a of the second prism 22 are arranged to be opposed to each other with an air layer in-between.

An entrance lens 16c is affixed onto the first incident surface 21a of the first prism 21. The entrance lens 16c is provided to convert the illumination light to be telecentric. The incident surface 21a of the first prism 21 may be made to form a curved surface to function like the entrance lens 16c.

The illumination light from the illumination relay optical system 18 enters the first prism 21 through the first incident surface 21a after passing through the entrance lens 16c. The critical surface 21b of the first prism 21 is arranged so as to totally reflect the incident illumination light. The illumination light reflected by the critical surface 21b is emitted from the first exit surface 21c of the first prism 21 to illuminate the DMD 24.

The DMD 24 has a rectangular image display area. Each pixel (micromirror) of the DMD 24 has a deflection axis declined by a 45-degree with respect to the rectangular display area. The image display is performed by deflecting the pixel by 12 degrees about the deflection axis to change the reflective direction of the illumination light. The light flux reflected by the pixel in an image display state (ON state), namely, a projection light, enters the first prism 21 again through the first exit surface 21c of the first prism 21, and reaches the critical surface 21b of the first prism 21. Since the projection light enters the critical surface 21b at an angle, which does not fulfill a total reflection conditions, the projection light pass through the critical surface 21b, and enters the second prism 22 though the second incident surface 22a after passing through the air layer. The projection light is emitted from the second exit surface 22b of the second prism 22 to enter the projection optical system 20, and is projected onto the screen.

In the present invention, the prism unit 23 is not an indispensable element. The projection apparatus can be configured such that the illumination light exited from the rod integrator 15 directly illuminates the DMD 24 through the illumination relay optical system 18. The image display element is not limited to the DMD 24. Other element that has the same function, such as a liquid crystal display element, can be used as the image display element. A reflection type element may be used, and a transmission type element may be used.

Next, a variable-aperture diaphragm (projection variable-aperture diaphragm 40, and illumination variable-aperture diaphragm 17) provided separately in the projection optical system 20 and the illumination relay optical system 18 will be described. The projection variable-aperture diaphragm 40 and the illumination variable-aperture diaphragm 17 both have the same configuration. The projection variable-aperture diaphragm 40 and the illumination variable-aperture diaphragm 17 each includes an aperture diaphragm position sensor 32 for detecting an aperture diaphragm state and an aperture diaphragm drive motor 33 for changing the aperture diameter, and the aperture diameter can be varied between F 2.4 and F 7.2.

Figure 3A:
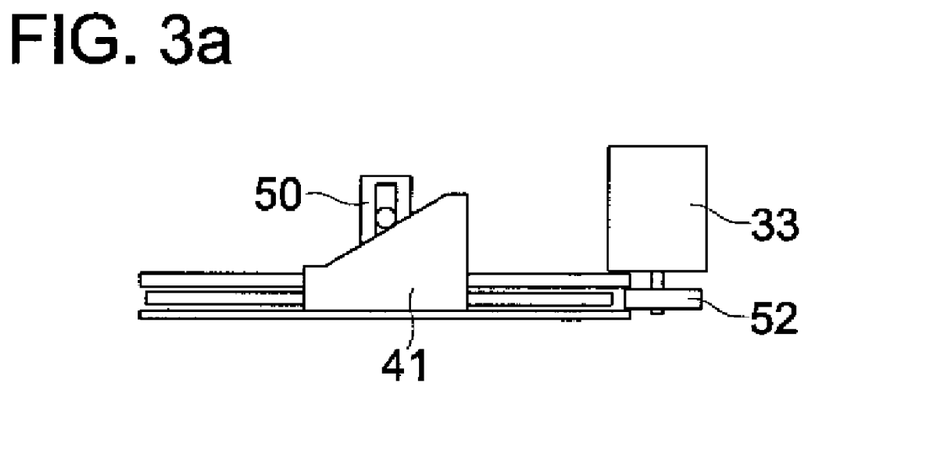
FIG. 3a is a diagram showing a basic configuration of a variable aperture-diaphragm (top view)
Figure 3B:
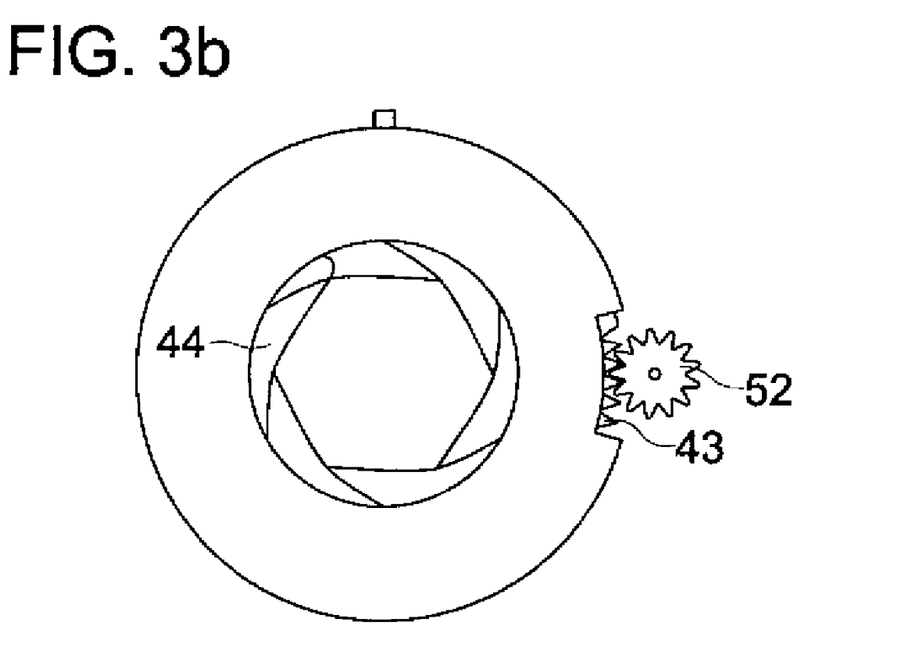
FIG. 3b is a diagram showing a basic configuration of the variable aperture-diaphragm (front view)
Figure 4:
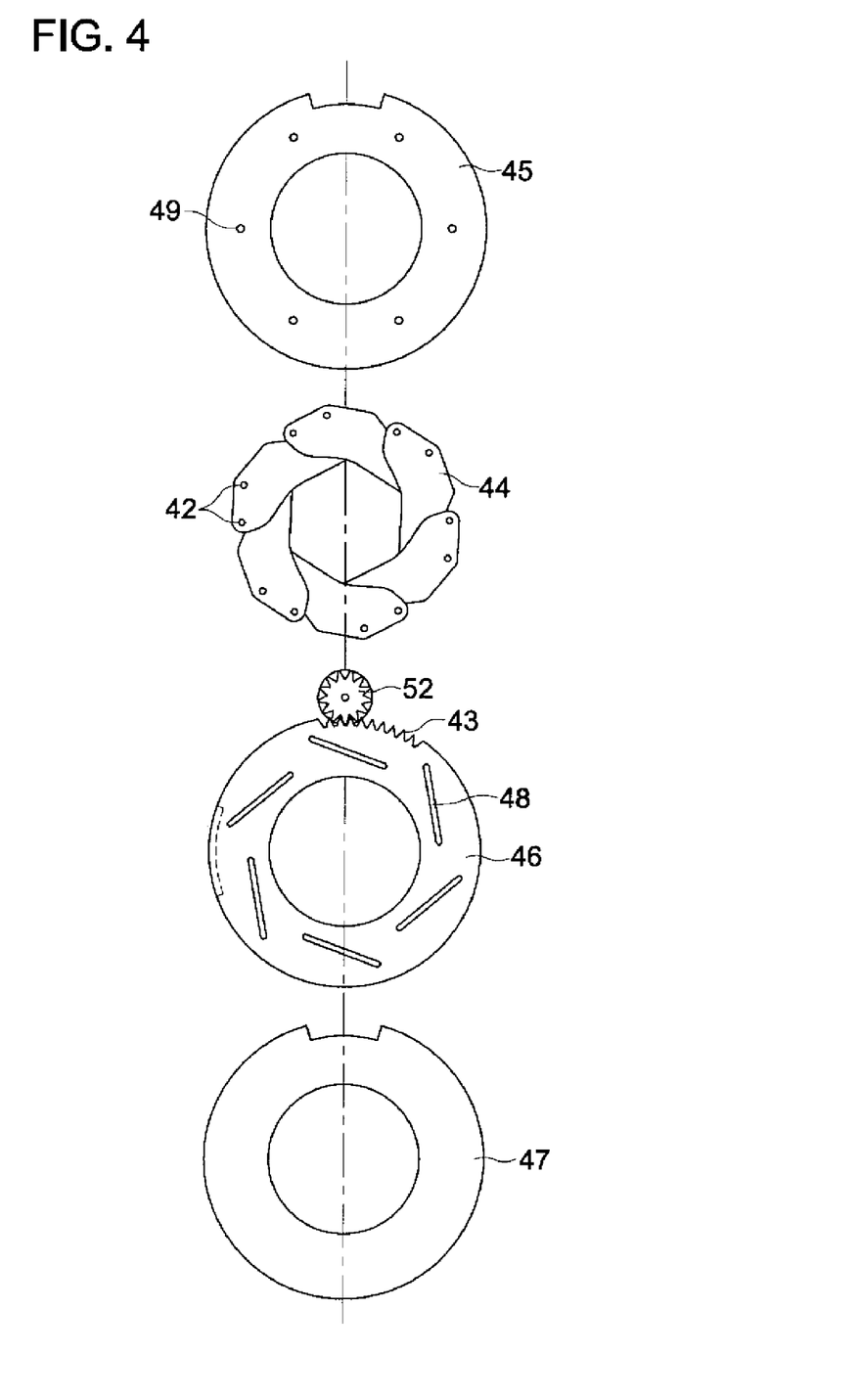
FIG. 4 illustrates an exploded view of the variable-aperture diaphragm.

FIGS. 3a and 3b are diagrams showing a basic configuration of a variable-aperture diaphragm. FIG. 3a is a top view of the variable-aperture diaphragm. FIG. 3b is a front view of the variable-aperture diaphragm. FIG. 4 is an exploded view of the variable aperture diaphragm.

The variable-aperture diaphragm is configured of a fixing plate 45, a rotation plate 46, a cover 47, and six aperture diaphragm blades 44. Two pins 42 are attached on each aperture diaphragm blade 44. One of the two pins 42 attached on the aperture diaphragm blade 44 is fitted into a hole 49 of the fixing plate 45, and the other pin 42 attached on the aperture diaphragm blade 44 is fitted into a cam slit 48 of the rotation plate 46. The rotation plate 46 includes a gear section 43. The gear section 43 is engaged with a gear 52 provided in the aperture diaphragm drive motor 33. The rotation of the rotation plate 46 cased by the rotation of the diaphragm drive motor 33 causes the rotation of the diaphragm blades 44 about the pins 42 fitted into the holes 49 in the fixing plate 45, thus the aperture diameter of the diaphragm changes.

The rotation plate 46 includes a projection 41 having a slope. This projection 41 engages with a linear sliding variable resistor 50. Then, the resistor value changes depending on the rotation of the rotation plate 46, namely, depending on a change in the aperture diameter of the variable-aperture diaphragm. The aperture diameter of the variable-aperture diaphragm can be detected by this resistor value.

The aperture diameter of the projection variable-aperture diaphragm 40 and the illumination variable-aperture diaphragm 17 can be adjusted individually. However, in order to obtain an acceptable projection image with higher contrast, it is preferred to control each variable-aperture diaphragm such that the F value of the projection optical system 20 and the F value of the illumination optical system will be the same. In particular, in the case of using the DMD 24 as the image display element, when the F values of both diaphragm are set to be the same in response to stopping down of the projection variable-aperture diaphragm, the scattered light generated on the display surface is reduced due to a decrease of the light illuminating the DMD 24, and thereby greatly improving the contrast.

Next, a change of the illumination optical system in the case of making the aperture diameter of the projection variable-aperture diaphragm 40 smaller will be described.

As shown in FIG. 2, the illumination optical system is changed by inserting the concave lens 13 in front of the rod integrator 15 in this embodiment of the present invention. As shown in FIG. 1, since the concave lens 13 is evacuated from an optical path when the aperture diameter of the projection variable-aperture diaphragm 40 is large, a converged light from the lamp reflector 12 enters into the rod integrator 15 without a convergence angle being moderated.

On the other hand, when the aperture diameter of the projection variable-aperture diaphragm 40 is made smaller, a calculation section 36 that received information from the aperture diaphragm position sensor 32 issues instruction to a concave lens switching mechanism 31, and the illumination optical system is changed with the concave lens 13 inserted as shown in FIG. 2. The concave lens switching mechanism 31 includes an actuator, such as a motor. The concave lens switching mechanism 31 is a mechanism for switching between the two stats of the concave lens 13 being evacuated from and inserted in the optical path. The converged light from the lamp reflector 12 enters the rod integrator 15 with the convergence angle being moderated by the inserted concave lens 13.

Thus, a light beam that entered the rod integrator 15 with the convergence angle being moderated is emitted from the rod integrator 15 at a smaller angle with respect to the optical axis than when the concave lens 13 being evacuated. Since the exit surface of the rod integrator 15 and the display surface of DMD 24 are approximately telecentric and optically conjugated with each other, the light beam at a small angle with respect to the optical axis at the exit surface of the rod integrator 15 enters the display surface of DMD 24 at a small angle with respect to the optical axis. Further, since the projection optical system 20 is also practically a telecentric optical system, the light beam reflected on the display surface of the DMD at the smaller angle passes the position nearer to the optical axis at the pupil position of the projection optical system, that is, the position of the projection variable-aperture diaphragm.

Therefore, the light intensity distribution changes such that the amount of the light passing through the region, in a plane perpendicular to the optical axis at the position of the projection variable-aperture diaphragm 40, closer to the optical axis is larger than before by the insertion of the concave lens 13. Therefore, in the case where the aperture diameter of the projection variable-aperture diaphragm 40 is smaller, the amount of the light passing through the opening of the projection variable-aperture diaphragm 40 is greater than when the concave lens 13 being in the evacuated state, and thus a brighter projection image is obtained.

Thus, the decrease in brightness when the aperture diameter of the projection variable-aperture diaphragm 40 is made small to obtain the high contrast can be effectively controlled by a simple configuration by configuring such that the illumination optical system is changed by the insertion of the concave lens 13. Here, the calculation section 36, the concave lens switching mechanism 31 and the concave lens 13 function as an optical system changing section, which changes the illumination optical system such that the amount of the light passing through the opening of the projection variable-aperture diaphragm 40 increases when the aperture diameter of the projection variable-aperture diaphragm 40 is made smaller.

Here, the concave lens 13 is used as the optical system changing section. However, other optical element can be used in a similar manner if the optical element has a function for diverging light flux. For example, an optical element that has an aspheric surface, a cylinder surface, and a toroidal surface other than a diverging lens (concave lens) whose optical surface is a spherical surface may be used. An optical element that has a cone prism surface called an axicon can also be used. In particular, it is preferable to use the diverging lens (concave lens) whose optical surface is a spherical surface for the reason that the projection apparatus can be manufactured at low cost.

Further, as a modification of this embodiment of the present invention, it may be configured such that the optical element, which converges light flux, is in the sate of being inserted in the illumination optical system when the aperture diameter of the projection variable-aperture diaphragm 40 is made big, and may be configured so as to increase the amount of the light passing through the opening of the projection variable-aperture diaphragm by evacuating the optical element when the aperture diameter is made small.

As in the above-mentioned case in which the concave lens 13 is used, the decrease in the brightness when the aperture diameter of the projection variable-aperture diaphragm 40 is made smaller to obtain the high contrast can be effectively controlled by a simple configuration by configuring as described above.

The optical element that converges light flux is not particularly limited. Various forms of the optical element can be arbitrarily chosen and used. In particular, it is preferable to use the collective lens (convex lens) whose optical surface is a spherical surface for the reason that the projection apparatus can be manufactured at low cost.

Figure 5:
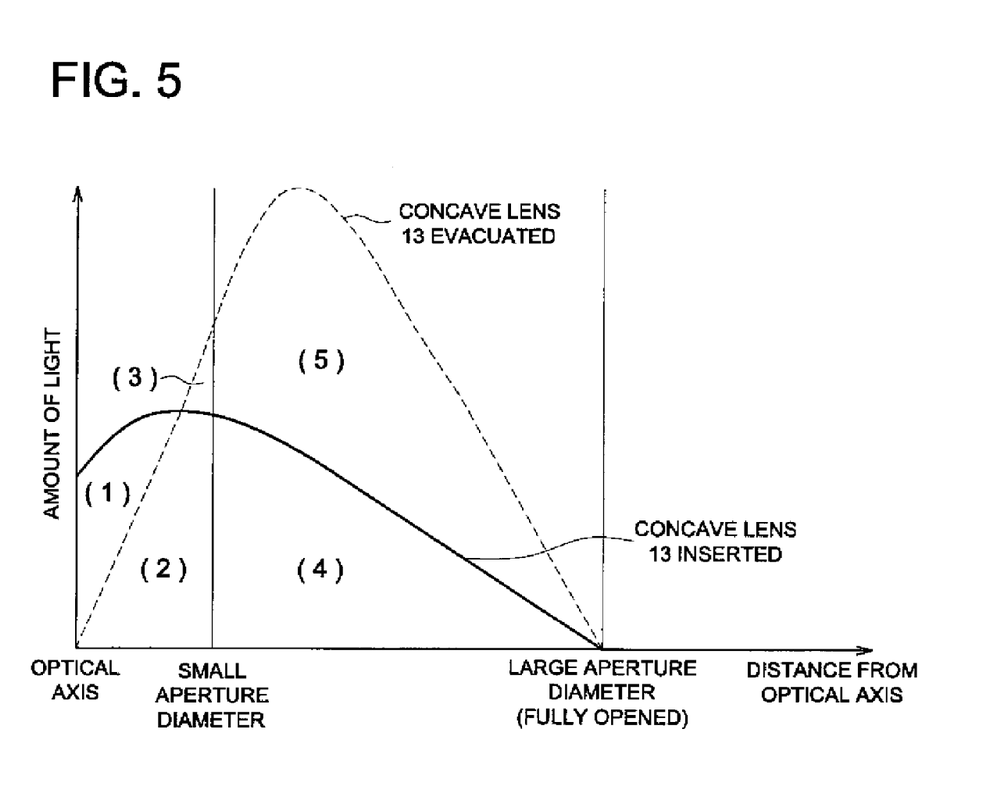
FIG. 5 is a graph showing a change in light intensity distribution between the two positions of a projection variable-aperture diaphragm.

Next, a change of the light intensity distribution at the position of the projection variable-aperture diaphragm 40 (projection pupil surface) will be described using FIG. 5. FIG. 5 illustrates a graph that conceptually shows a change of the light intensity distribution at the position of the projection variable-aperture diaphragm 40. A horizontal axis represents a distance from the optical axis, and a vertical axis represents an amount of light. A dashed line indicates the amount of light when the concave lens 13 being in the evacuated state. A solid line indicates the amount of light when the concave lens 13 being in the inserted state. This graph conceptually shows the change of the light intensity distribution while taking into consideration that the area of the cross section perpendicular to the optical axis changes with the distance from the optical axis.

In the case where the concave lens 13 is in the evacuated state, the amount of the light passing through the opening of the projection variable-aperture diaphragm 40 corresponds to the area of (2)+(3)+(4)+(5) of FIG. 5 when the projection variable-aperture diaphragm 40 is opened (state where the aperture diameter is large), and corresponds to the area of (2)+(3) of FIG. 5 when the aperture diameter of the projection variable-aperture diaphragm 40 is smaller. On the other hand, in the case where the concave lens 13 is inserted, the light intensity distribution changes to the situation where the amount of the light passing through the region close to the optical axis becomes large. The amount of the light passing through the opening of the projection variable-aperture diaphragm corresponds to the area of (1)+(2)+(4) of FIG. 5 when the projection variable-aperture diaphragm 40 is opened. The amount of the light passing through the opening of the projection variable-aperture diaphragm 40 corresponds to the area (1)+(2) of FIG. 5 when the aperture diameter of the projection variable-aperture diaphragm 40 is smaller.

Therefore, when enlarging the aperture diameter of the projection variable-aperture diaphragm 40, a brighter projection image is obtained by evacuating the concave lens 13. On the other hand, when making the aperture diameter of the projection variable-aperture diaphragm 40 smaller to obtain high contrast, the decrease in the brightness can be minimized by changing the illumination optical system by inserting the concave lens 13.

Figure 6:
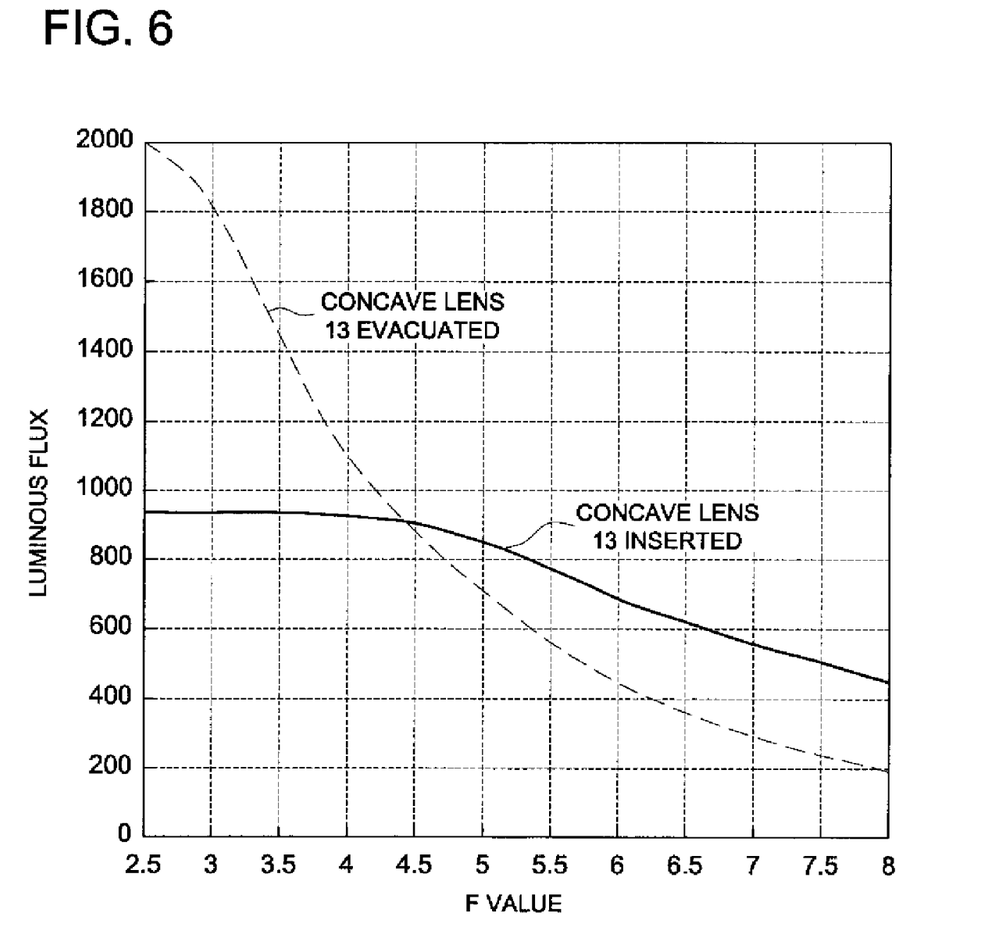
FIG. 6 is a graph showing an example of a relationship between the F value of a projection optical system and the brightness of a projection image.

FIG. 6 illustrates a graph that shows an example of the relationship between the F value of the projection optical system 20 and the brightness of the projection image. The horizontal axis of the graph represents the F value of the projection optical system 20. The vertical axis of the graph represents the luminous flux that reaches the screen.

A dashed line represents the relationship when the concave lens 13 being in the evacuated state. The solid line represents the relationship when the concave lens 13 being in the inserted state.

As the F value of the projection optical system 20 becomes larger (as the aperture diameter of the projection variable-aperture diaphragm 40 becomes smaller), the brightness of the projection image becomes darker (the luminous flux becomes small). At this time, in the case where the F value is smaller than 4.5, the projection image is brighter with the concave lens 13 being in the evacuated state. In the case where the F value is equal to or larger than 4.5, the projection image is brighter with the concave lens 13 being in the inserted state. Therefore, after it is determined in the calculation section 36 based on the aperture diameter of the projection variable-aperture diaphragm 40 detected by the aperture diaphragm position sensor 32 whether the F value of the projection optical system 20 is larger or smaller than a predetermined value (F value is 4.5 in the example of FIG. 6), the concave lens 13 is inserted when the F value is equal to or more than the predetermined value, or the concave lens is evacuated when the F value is less than the predetermined value, and thus a brighter projection image is obtained in any case.

Second Embodiment of the Present Invention

Figure 7:
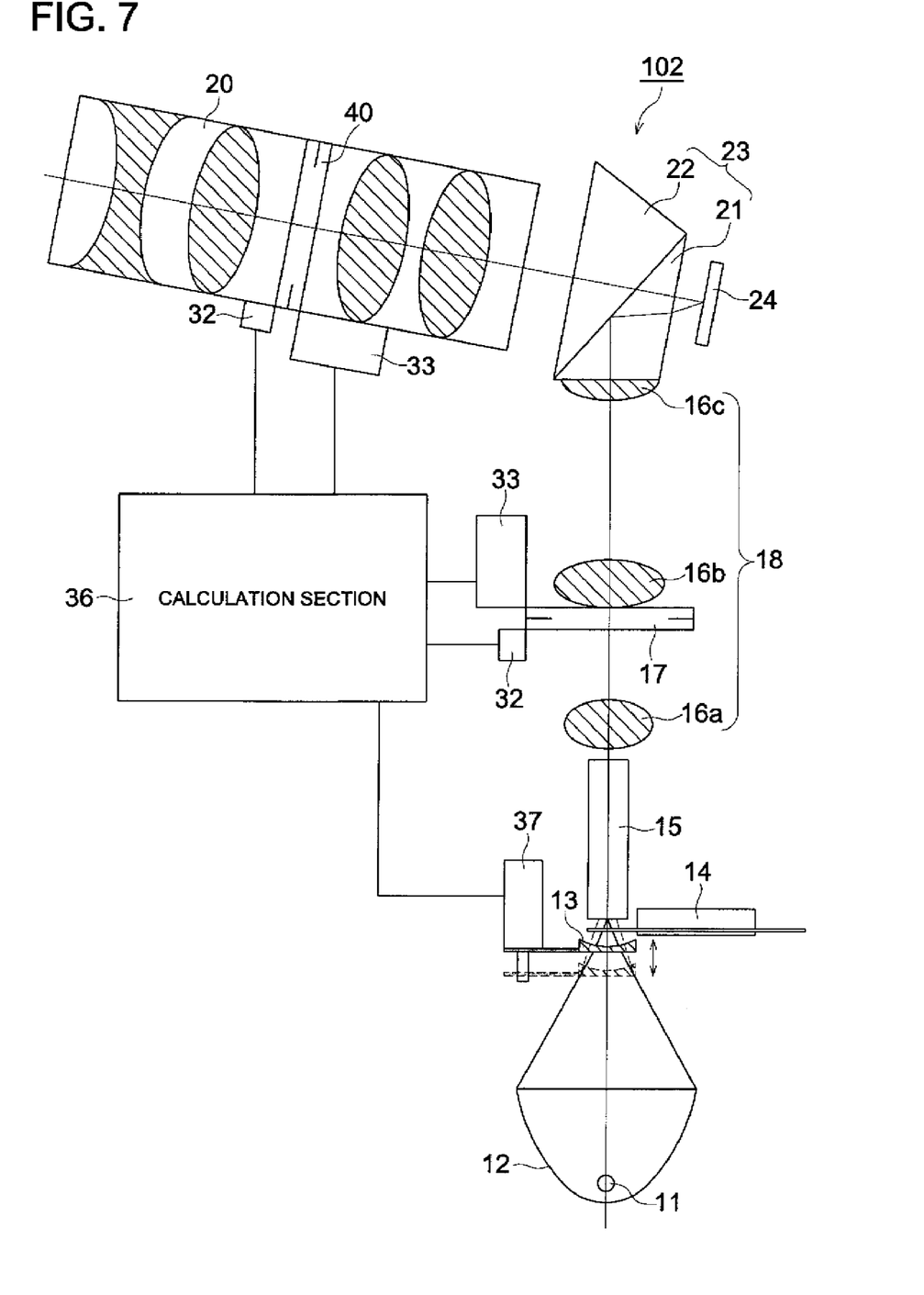
FIG. 7 is a configuration diagram of a projection apparatus 102 of a second embodiment of the present invention.

Next, a second embodiment of the projection apparatus of the present invention is described with reference to FIG. 7. FIG. 7 illustrates a configuration diagram of a projection apparatus 102 of the second embodiment of the present invention. The difference between the projection apparatus 101 of the above-mentioned first embodiment of the present invention and the projection apparatus 102 of the second embodiment of the present invention is the fact that the illumination optical system is changed by moving the concave lens 13 (diverging lens) in the optical axis direction by the concave lens driving mechanism 37 in the second embodiment, instead of inserting and evacuating the concave lens 13 depending on the aperture diameter of the projection variable-aperture diaphragm 40 in the first embodiment.

In this embodiment of the present invention, an optical system changing section is configured of the concave lens 13 as a moving element which is a part of the condensing optical system, and the calculation section 36 and the concave lens driving mechanism 37 both as the optical element moving mechanisms, and it changes the illumination optical system such that the amount of the light passing through the projection variable-aperture diaphragm 40 increases when the aperture diameter of the projection variable-aperture diaphragm 40 is made smaller. Here, the concave lens driving mechanism 37 includes the actuator, such as a motor. The concave lens driving mechanism 37 is a mechanism for moving the concave lens 13 in the optical axis direction by the actuator.

The concave lens 13 is supported by the concave lens driving mechanism 37, which operates according to the instructions from the calculation section 36. The concave lens 13 is moved closer to the light source (discharge lamp 11), as the F value increases, depending on the aperture diameter of the projection variable-aperture diaphragm (the F value of the projection optical system 20) detected by the aperture diaphragm position sensor 32 so that the light flux efficiently passes through the aperture when it is stopped down.

The light beam from the lamp reflector 12 passes through closer to the optical axis of the concave lens 13 as the concave lens 13 becomes closer to the rod integrator 15. The inclination of the lens surface of the concave lens 13 is more moderate and the refractive effect is smaller toward the optical axis. Therefore, the refraction operation of the concave lens 13 is very small when it is located near the focused point of the converging light from the lamp reflector 12.

On the other hand, as the concave lens 13 is closer to the light source side, the light beam passes through closer to the circumference of the concave lens 13, and thus the light beam is converged more moderately being subjected to the greater refractive effect of the concave lens 13.

As in the case of the first embodiment of the present invention, the light intensity distribution can be changed such that the amount of the light passing through the region, in the plane perpendicular to the optical axis at the position of the projection variable-aperture diaphragm 40, close to the optical axis becomes larger by making the light flux, which enters into the rod integrator 15, be converged more moderately. Therefore, when the concave lens 13 is arranged in the condensing optical system as a part thereof and the aperture diameter of the projection variable-aperture diaphragm 40 is made small, by moving the concave lens 13 toward the light source along the optical axis, the amount of the light passing through the projection variable-aperture diaphragm 40 gets larger than before the movement of the concave lens 13 of, and thus a brighter projection image is obtained. In this embodiment of the present invention, since the amount of light can be continuously adjusted depending on the aperture diameter of the projection variable-aperture diaphragm 40, the projection image can be obtained which has a higher contrast and whose brightness is not much decreased even when the aperture diaphragm is stopped down.

In this embodiment of the present invention, described is the configuration for moving the concave lens 13 (diverging lens), arranged in the condensing optical system, along the optical axis toward the light source so that the amount of the light passing through the opening of the projection variable-aperture diaphragm increases when the aperture diameter of the projection variable-aperture diaphragm 40 becomes small. Alternatively, another configuration may be used in which a convex lens (collective lens) as the moving element which is a part of the condensing optical system is provided in the condensing optical system to increase the amount of the light passing through the opening of the projection variable-aperture diaphragm by moving the convex lens along the optical axis toward the rod integrator (the opposite direction of the light source) when and making the aperture diameter small.

Also in this embodiment of the present invention, a form of the optical elements used as the diverging lens or the collective lens is not particularly limited. Various optical elements can be used as in the case of the first embodiment of the present invention.

Third Embodiment of the Present Invention

Figure 8:
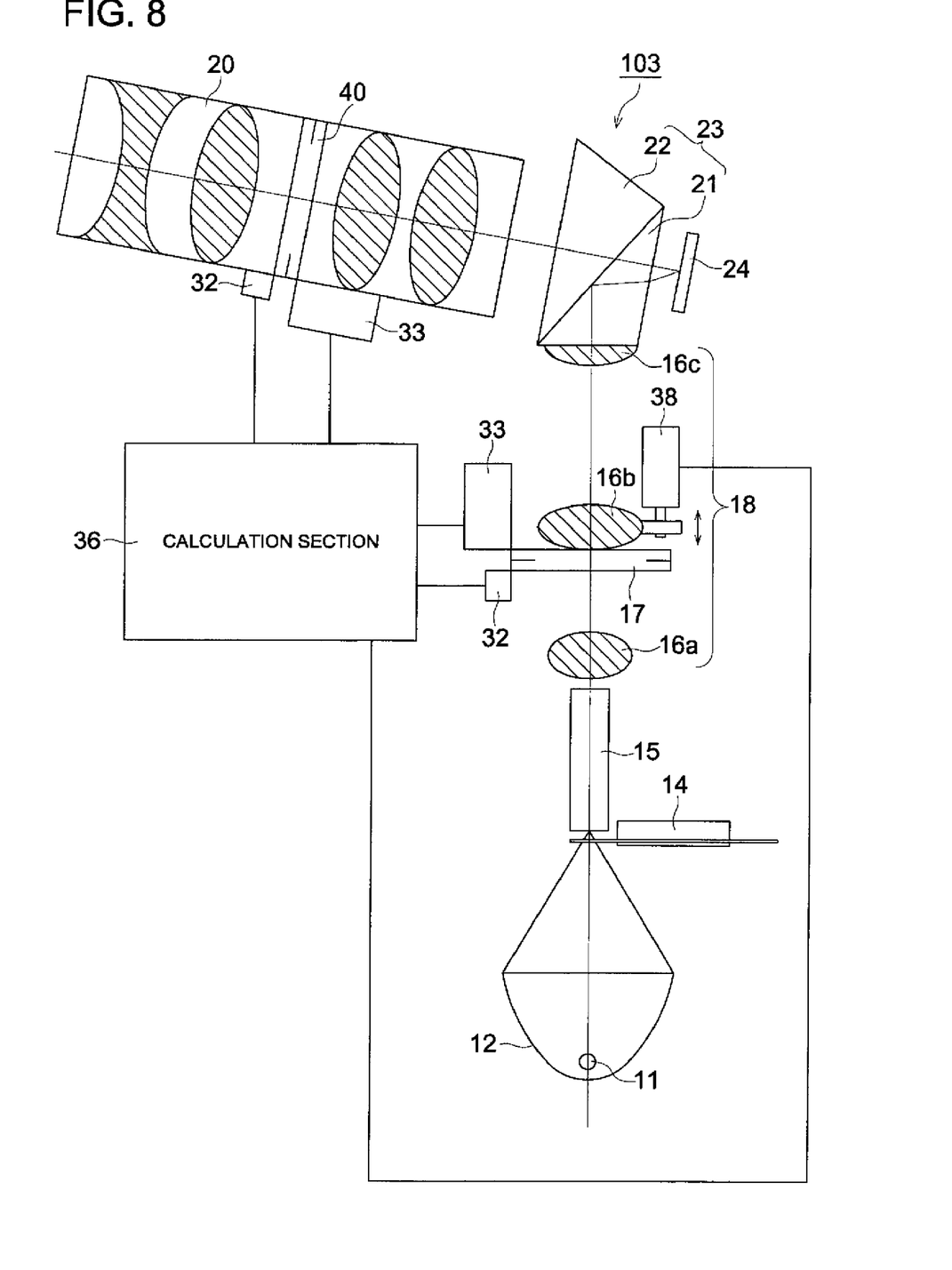
FIG. 8 is a configuration diagram of a projection apparatus 103 of a third embodiment of the present invention.

Next, a third embodiment of the projection apparatus of the present invention is described with reference to FIG. 8. FIG. 8 is a block diagram of a projection apparatus 103 of the third embodiment of the present invention. The difference from the projection apparatus 101 of the above-mentioned first embodiment of the present invention is the fact that the illumination optical system is changed by moving a part of the optical element constituting the illumination relay optical system 18 in the direction of the optical axis instead of inserting and evacuating the concave lens 13 depending on the aperture diameter of the projection variable-aperture diaphragm 40.

In this embodiment of the present invention, the optical system changing section for changing the illumination optical system in response to the change of the aperture diameter of the projection variable-aperture diaphragm 40 is configured of a convex lens 16b as a moving element, as well as the calculation section 36 and a relay lens drive mechanism 38 both as an optical element moving mechanism. The relay lens drive mechanism 38 is a mechanism having an actuator, such as a motor, to move a convex lens 16b in the direction of the optical axis.

The convex lens 16b, which is a part of the optical element that constitutes the illumination relay optical system 18, is supported by the relay lens drive mechanism 38 that operates according to the instruction from the calculation section 36. The convex lens 16b is moved depending on the aperture diameter of the projection variable-aperture diaphragm 40 detected by the aperture diaphragm position sensor 32, and is put closer to the exit surface of the rod integrator 15 as the F value becomes larger.

The illumination relay optical system 18 makes an image of the exit surface of the rod integrator 15 on the display surface of DMD 24.

As the convex lens 16b constituting the illumination relay optical system 18 is moved away from the exit surface of the rod integrator 15, the image, of the exit surface of the rod integrator 15, on the display surface of DMD 24 gets smaller. As the convex lens 16b is moved closer to the exit surface of the rod integrator 15, the image, of the exit surface of the rod integrator 15, on the display surface of DMD 24 gets larger.

Denoting the N.A. on the exit surface side of the rod integrator 15 by u, the N. A. of the image side of the exit surface of the rod integrator 15 by u', and the image magnification by β, a relationship u=β×u' is established. Therefore, as the image, of the exit surface of the rod integrator 15, on the display surface of DMD 24 becomes larger, the N.A. of the image becomes smaller, and for this reason the light beam reflected by the DMD 24 passes through the pupil plane of the projection optical system 20 (position of the projection variable-aperture diaphragm 40) at a position closer to the optical axis.

Thus, moving the convex lens constituting the illumination relay optical system 18 along the optical axis toward the exit surface side of the rod integrator 15 causes the light intensity distribution to change such that the amount of the light passing through the region, at the position of the projection variable-aperture diaphragm 40, near the optical axis becomes large. Therefore, when the aperture diameter of the projection variable-aperture diaphragm 40 is made small, the amount of the light passing through the aperture with that diameter becomes greater than before the movement of the convex lens 16, and thus a brighter projection image is obtained.

In this embodiment of the present invention, since there is no need for a lens to be provided, in front of the rod integrator 15, for changing the condensing optical system, the loss of light amount caused by a lens interface is reduced. In this embodiment of the present invention, since the amount of light can be continuously adjusted, as in the case of the second embodiment of the present invention, depending on the aperture diameter of the projection variable-aperture diaphragm 40, the projection image of higher contrast and less decrease in brightness caused by the change of the aperture diaphragm can be obtained.

The lens to be moved is not particularly limited as long as the lens constitutes the illumination relay optical system 18. However, in order to acquire a high effect by a small moving distance, it is preferable to move a lens, among the lenses constituting the illumination relay optical system 18, that causes a large magnification change when moved in the optical axis direction, namely, a lens with a large focusing power. It is more preferable to move the lens that causes the largest magnification change when moved in the optical axis direction.

Fourth Embodiment of the Present Invention

Figure 9:
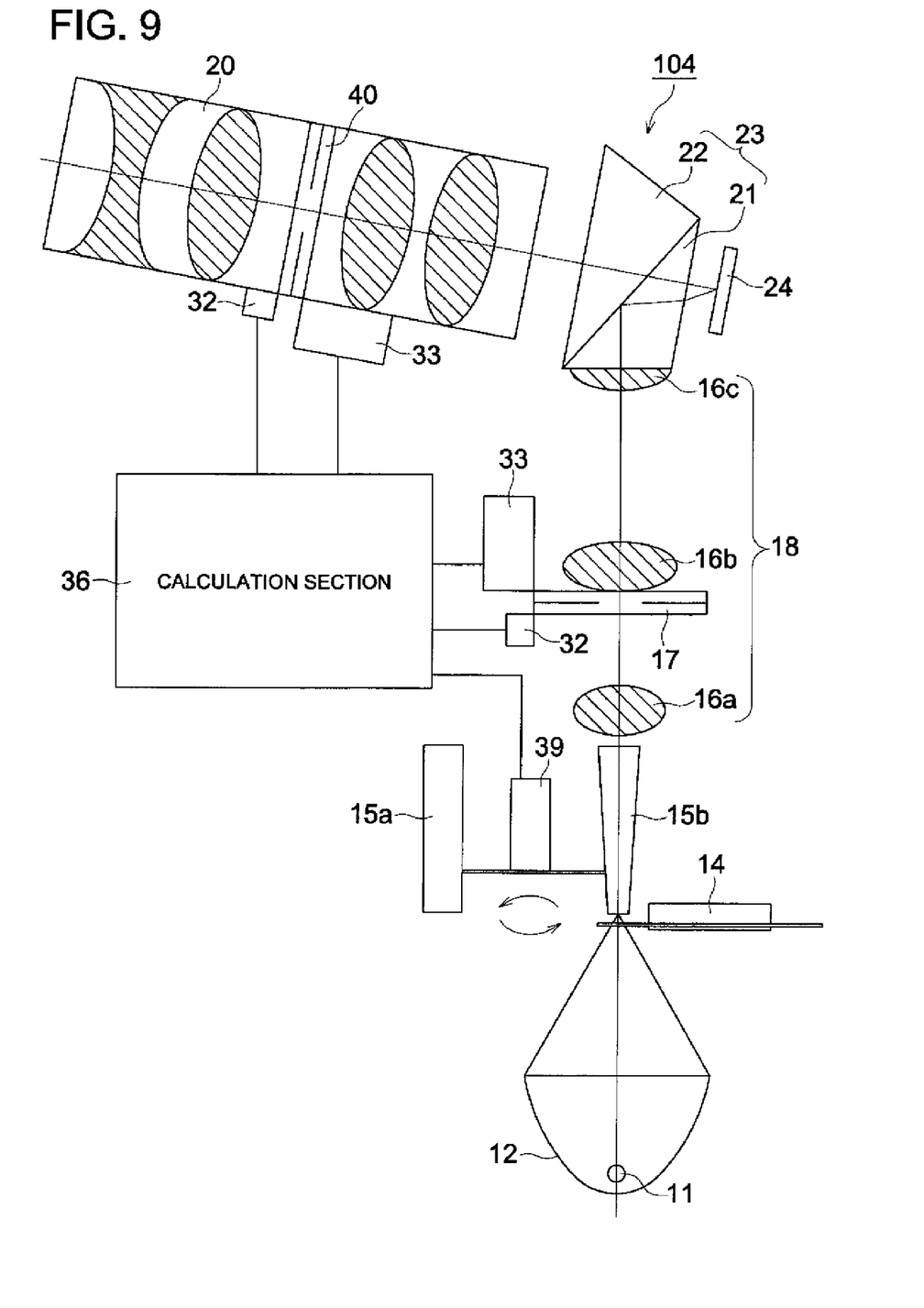
FIG. 9 is a configuration diagram of a projection apparatus 104 of a fourth embodiment of the present invention.

Next, a fourth embodiment of the projection apparatus of the present invention will be described with reference to FIG. 9. FIG. 9 is a configuration diagram of a projection apparatus 104 of the fourth embodiment of the present invention. The difference between this embodiment of the present invention and the above-mentioned projection apparatus 101 of the first embodiment of the present invention is the fact that the forth embodiment changes the illumination optical system by switching a straight shaped rod integrator 15a and a taper-shaped rod integrator 15 whose incident surface is shrunk, instead of evacuating and inserting the concave lens 13 depending on the aperture diameter of the projection variable-aperture diaphragm 40.

In this embodiment of the present invention, the optical system changing section for changing the illumination optical system when the aperture diameter of the projection variable-aperture diaphragm 40 is made smaller is configured of the rod integrators 15a and 15b, the calculation section 36 and a rod switching mechanism 39. The rod switching mechanism 39 includes an actuator, such as a motor. The rod switching mechanism 39 is a mechanism for switching the rod integrators 15a and 15b by the actuator.

The area of the exit surface and the area of the incident surface are substantially the same in the straight shaped rod integrator 15a. On the other hand, in the taper shaped rod integrator 15b, the area of the incident surface is smaller than the area of the exit surface. The two rod integrators are both supported by the rod switching mechanism 39, and are switched under the instructions from the calculation section 36. When the aperture diameter of the projection variable-aperture diaphragm 40 is large, the straight shaped rod integrator 15a is used. However, when the aperture diameter of the projection variable-aperture diaphragm 40 is small, the straight-shaped rod integrator 15a is replaced by the taper-shaped rod integrator 15b whose incident side is shrunk so that the light flux passes through efficiently when the diaphragm is stopped down.

In the case of the inclined inner reflection surface being wider toward the exit side as in the taper-shaped rod integrator 15b, the angle of the reflected light beam becomes moderate, namely, the angle between the light beam and the optical axis becomes small. Therefore, the light beam reflected by the inside surface of the taper-shaped rod integrator 15b passes through the projection lens pupil plane (position of the projection variable-aperture diaphragm 40) at the position, on the plane, closer to the axis.

On the other hand, in the straight shaped rod integrator 15a, the light beam reflects by the inside surface does not change its angle with respect to the optical axis. Therefore, by changing the straight-shaped rod integrator 15a with the taper-shaped rod integrator 15b whose incident surface is shrunk, at least a part of the light beam passing through the pupil plane of the projection lens is caused to pass through the pupil plane at the position, on the plane, closer to the optical axis. Therefore, when the aperture diameter of the projection variable-aperture diaphragm 40 is made small, the amount of the light passing through the opening, with that diameter, of the projection variable-aperture diaphragm 40 gets larger than before the rod integrators being changed, and thus the brighter projection image is obtained.

In this embodiment of the present invention, since no lens for changing the condensing optical system needs to be provided in front of the rod integrator, the loss of light mount caused by the lens interface is reduced.

Fifth Embodiment of the Present Invention

Figure 10:
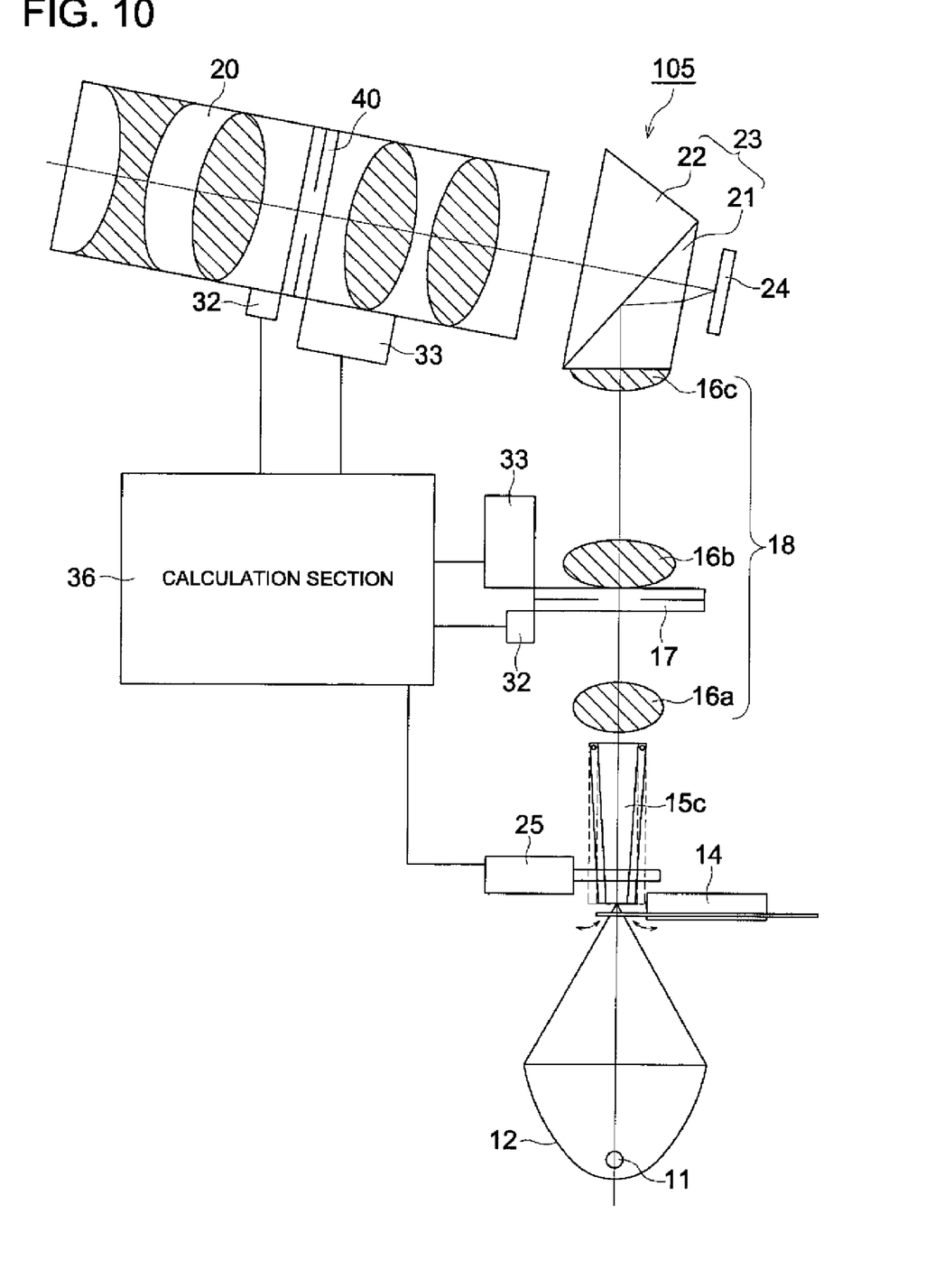
FIG. 10 is a configuration diagram of a projection apparatus 105 of a fifth embodiment of the present invention.

Next, a fifth embodiment of the projection apparatus of the present invention will be described with reference to FIG. 10. FIG. 10 is a configuration diagram of a projection apparatus 105 of the fifth embodiment of the present invention. The difference from the above-mentioned projection apparatus 104 of the fourth embodiment is the fact that in order to change the illumination optical system in the present invention, the inclination angle of the reflection surface of the rod integrator is configured to be changed depending on the F value of the projection optical system 20 instead of changing the straight-shaped rod integrator 15a and the taper-shaped rod integrator 15b.

In this embodiment of the present invention, the optical system changing section that changes the illumination optical system when the aperture diameter of the projection variable-aperture diaphragm 40 is made small is configured of a rod integrator 15c, a calculation section 36, and a rod reflection surface inclining mechanism 25. The rod reflection surface inclining mechanism 25 is a mechanism for changing the inclination angle of the reflection surface of the rod integrator 15c. Its configuration may be as follows, for example.

The rod reflection surface inclining mechanism 25 includes a motor. Two opposing reflection surfaces of the rod integrator 15c of the projection apparatus 105 are engaged to the rotation shaft of the motor at their incident side. The two reflection surfaces are supported rotatably at the exit side. The rotation shaft of the motor of the rod reflection surface inclining mechanism 25 is provided with a right hand thread and a left hand thread at the tip and the base of the rotation shaft, respectively. One of the two reflection surfaces is engaged to the right hand thread and the other to the left hand thread. With this arrangement, the inclination angle of the reflection surface changes with the engaged portions of the two reflection surfaces approaching each other or moving away from each other according the rotation of the rod reflection surface inclining mechanism 25 instructed by the calculation section 36.

As the rod reflection surface inclining mechanism 25 causes the engaged sections of the two reflection surfaces to get closer to each other, the ratio of the area of the incident surface to the area of the exit surface becomes smaller, and the light beam reflected in the rod integrator 15c has a smaller angle with respect to the optical axis. Therefore, at least a part of the light beam is caused to pass through the pupil plane of the projection lens at a position, on the pupil plane, closer to the axis by changing the inclination of the reflection surfaces of the rod integrator such that the ratio of the area of the incident surface to the area of the exist surface of the rod integrator 15c becomes small when the opening of the projection variable-aperture diaphragm 40 is made small. Thus, when the aperture diameter of the projection variable-aperture diaphragm 40 is made small, the amount of the light passing through the opening, with that diameter, of the projection variable-aperture diaphragm 40 gets larger than before changing the inclination, and a brighter projection image is obtained.

Since the lens for changing the condensing optical system does not need to be arranged in front of the rod integrator, the loss of the amount of light by the lens interface can be prevented just as the case of the fourth embodiment of the present invention.

According to the above-mentioned embodiments, since there is the optical system changing section for changing, when the aperture diameter of the projection variable-aperture diaphragm is made smaller, the illumination optical system such that the amount of the light passing through the opening, with the diameter, of the projection variable-aperture diaphragm increases, the brightness is controlled not to be greatly decreased even in the case where the aperture diameter of the projection variable-aperture diaphragm is made smaller to obtain a higher contrast.

According to the above-mentioned embodiments, since the light intensity distribution is changed such that the amount of the light passing through the region, in the plane which is at the position of the projection variable-aperture diaphragm and perpendicular to the optical axis, close to the optical axis becomes large, the brightness is controlled not to be decreased even in the case where the aperture diameter of the projection variable-aperture diaphragm is made smaller to obtain a higher contrast.

According to the above-mentioned embodiment, since the amount of the light passing through the opening of the projection variable-aperture diaphragm is increased by changing the illumination optical system with the optical element for dispersing the light flux inserted into the condensing optical system, the brightness is controlled effectively not to be decreased with the simple configuration when the aperture diameter of the projection variable-aperture diaphragm is made smaller to obtain a higher contrast.

According to the above-mentioned embodiment, since the illumination optical system is changed by inserting the diverging lens in the condensing optical system, the projection apparatus can be manufactured at low cost.

According to the above-mentioned embodiment, since the amount of the light passing through the opening of the projection variable-aperture diaphragm is increased by changing the illumination optical system with the optical element converging the light flux removed from the condensing optical system, the brightness is controlled effectively not to be decreased with a simple configuration when the aperture diameter of the projection variable-aperture diaphragm is made smaller to obtain a higher contrast.

According to the above-mentioned embodiment, since the illumination optical system is changed by removing the collective lens from the condensing optical system, the projection apparatus can be manufactured at low cost.

According to the above-mentioned embodiments, since the amount of the light passing through the opening of the projection variable-aperture diaphragm is increased by changing the illumination optical system a part of the optical element constituting the illumination optical system moved, the amount of light can be continuously adjusted depending to the aperture diameter of the projection variable-aperture diaphragm. Therefore, this arrangement provides projection images having a reduced drop of the brightness caused by the change of the aperture diameter and having a higher contrast.

According to the above-mentioned embodiment, since the amount of the light passing through the opening of the projection variable-aperture diaphragm is increased by changing the illumination optical system with the diverging lens moved along the optical axis toward the light source, the amount of light is continuously adjusted depending on the aperture diameter of the projection variable-aperture diaphragm. Therefore, this arrangement provides projection images having a reduced drop of the brightness caused by the change of the aperture diameter and having a higher contrast.

According to the above-mentioned embodiment, since the amount of the light passing through the opening of the projection variable-aperture diaphragm is increased by changing the illumination optical system the collective lens moved along the optical axis toward the rod integrator, the amount of light is continuously adjusted depending on the aperture diameter of the projection variable-aperture diaphragm. Therefore, this arrangement provides the projection image having a reduced drop of the brightness caused by the change of the aperture diameter and having a higher contrast.

According to the above-mentioned embodiment, since the amount of the light passing through the opening of the projection variable-aperture diaphragm is increased by changing the illumination optical system a part of the optical element sonstituting the illumination relay optical system moved in the optical axis direction, there is no need for an additional lens to be provided in front of the rod integrator, and thus the loss of light amount to be caused by the lens interface is prevented. The amount of light is continuously adjusted depending on the aperture diameter of the projection variable-aperture diaphragm. Therefore, this arrangement provides projection images having a reduced drop of the brightness caused by the change of the aperture diameter and having a higher contrast.

According to the above-mentioned embodiment, the amount of the light passing through the opening of the projection variable-aperture diaphragm is increased by changing the illumination optical system the ratio of the area of the incident surface to the area of the exit surface of the rod integrator made smaller, and therefore there is no need for an additional lens to be provided in front of the rod integrator, and thus the loss of light amount to be caused by the lens interface is prevented.

According to the above-mentioned embodiment, since the embodiment includes the illumination variable-aperture diaphragm for changing the aperture diaphragm value of the illumination optical system depending on the aperture diaphragm state of the projection variable-aperture diaphragm, the projection image with higher contrast is obtained.

According to the above-mentioned embodiment, since the digital micromirror device is used as the image display element, the contrast of the projection image is highly improved by making the aperture diameter of the projection variable-aperture diaphragm smaller, and thus projection images with higher contrast are obtained.

According to the above-mentioned embodiment, since the discharge lamp is used as the light source, the decrease of the brightness, to be caused by making the aperture diameter of the projection diaphragm smaller, is highly controlled.

What is claimed is:

1. A projection apparatus, comprising:
    an image display element for modulating illumination light;
    an illumination optical system for irradiating the image display element with the illumination light;
    a projection optical system for projecting the illumination light modulated by the image display element onto a projection surface, the projection optical system including:
        a projection variable-aperture diaphragm having an aperture whose aperture diameter is variable;
    an optical system changing section for changing the illumination optical system based on the aperture diameter of the projection variable-aperture diaphragm,
    wherein the optical system changing section changes the illumination optical system when the aperture of the projection variable-aperture diaphragm changes from a first size to a second size smaller than the first size, so that an amount of light which pass through an area corresponding to the aperture of the second size is greater than before changing the illumination optical system.

2. The projection apparatus of claim 1, wherein the optical system changing section changes the illumination optical system such that an amount of light passing through a region, in a plane which is at a position of the projection variable-aperture diaphragm and perpendicular to an optical axis of the projection optical system, close to the optical axis is greater than before changing the illumination optical system.

3. The projection apparatus of claim 1, wherein if an amount of light passing through the projection variable-aperture diaphragm with the second aperture diameter increases when the optical system changing section changes the illumination optical system in a certain manner, the optical system changing section changes the illumination optical system in the manner.

4. The projection apparatus of claim 1, wherein the illumination optical system includes:
    an illumination variable-aperture diaphragm for changing an aperture diameter of the illumination variable-aperture diaphragm depending on the aperture diameter of the projection variable-aperture diaphragm.

5. The projection apparatus of claim 1, wherein the image display element includes a digital micromirror device.

6. The projection apparatus of claim 1, wherein the light source includes a discharge lamp.

7. The projection apparatus of claim 2, wherein the illumination optical system includes:
    a light source;
    a condensing optical system for condensing light emitted from the light source;
    a rod integrator having an incident surface, an exit surface and a reflection surface which connects the incident surface and the exit surface, the rod integrator receiving the light condensed by the condensing optical system through the incident surface and emitting the received light from the exit surface after increasing uniformity of light intensity distribution, of the received light, on the exit surface; and
    a illumination relay optical system for guiding the light emitted from the exit surface of the rod integrator onto the image display element.

8. The projection apparatus of claim 7, wherein the optical system changing section includes:
    a diverging optical element for diverging light; and
    an optical system insertion and removal mechanism for supporting the diverging optical element to be removable from and insertable into an optical path of the illumination optical system,
    wherein when the aperture diameter of the projection variable-aperture diaphragm is changed to the second size, the optical element insertion and removal mechanism inserts the diverging optical element into the optical path of the illumination optical system at the incident side of the rod integrator.

9. The projection apparatus of claim 8, wherein the diverging optical element is a diverging lens.

10. The projection apparatus of claim 7, wherein the optical system changing section includes:
    a converging optical element which is disposed in an optical path of the illumination optical system at the incident side of the rod integrator and is configured to converge light; and
    an optical element insertion and removal mechanism for supporting the converging optical element to be removable from and insertable into the optical path of the illumination optical system, wherein when the aperture diameter of the projection variable-aperture diaphragm is changed to the second size, the optical element insertion and removal mechanism removes the converging optical element from the optical path of the illumination optical system.

11. The projection apparatus of claim 10, wherein the converging optical element is a converging lens.

12. The projection apparatus of claim 7, wherein the optical system changing section includes:
   a moving element which is comprised of a part of the illumination optical system; and
   an optical element moving mechanism for moving the moving element in a direction of an optical axis of the illumination optical system.

13. The projection apparatus of claim 12, wherein the optical system changing section includes a diverging lens which is disposed in an optical path of the illumination optical system at the incident side of the rod integrator and constitutes the moving element, and when the aperture diameter of the projection variable-aperture diaphragm is changed to the second size, the optical element moving mechanism moves the diverging lens toward the light source along the optical axis of the illumination optical system.

14. The projection apparatus of claim 12, wherein the optical system changing section includes a converging lens which is disposed in an optical path of the illumination optical system at the incident side of the rod integrator and constitutes the moving element, and when the aperture diameter of the projection variable-aperture diaphragm is changed to the second size, the optical element moving mechanism moves the converging lens toward the rod integrator along the optical axis of the illumination optical system.

15. The projection apparatus of claim 12, wherein the moving element includes a part of optical elements which constitute the relay optical system.

16. The projection apparatus of claim 7, wherein the optical system changing section includes:
   a rod changing mechanism for changing a ratio of an area of the incident surface of the rod integrator to an area of the exit surface thereof,
   wherein the rod changing mechanism decreases the ratio of the area of the incident surface of the rod integrator to the area of the exit surface thereof when the aperture diameter of the projection variable-aperture diaphragm is changed to the second size.

17. The projection apparatus of claim 16, wherein the rod integrator includes:
   a first rod integrator; and
   a second rod integrator in which a ratio of an area of an incident surface to an area of an exit surface is smaller than the first rod integrator,
   wherein the rod changing mechanism supports the first rod integrator and the second rod integrator such that either of the first rod integrator and the second rod integrator is selectively positioned on an optical axis of the illumination optical system, and when the aperture diameter of the projection variable-aperture diaphragm is changed to the second size, the rode changing mechanism removes the first rod integrator from the optical axis and positions the second rod integrator on the optical axis.

18. The projection apparatus of claim 16, wherein the rod changing mechanism changes, when the aperture diameter of the projection variable-aperture diaphragm is changed to the second size, an inclination angle of the reflection surface with respect to the optical axis of the illumination optical system such that the ratio of the area of the incident surface of the rod integrator to the area of the exit surface thereon decreases.

19. The projection apparatus of claim 16, comprising:
   a sensor for detecting and outputting information on the aperture diameter of the projection variable-aperture diaphragm; and
   a controller for controlling the optical system changing section based on the information on the aperture diameter outputted from the sensor.

20. A projection apparatus, comprising:
   an image display element for modulating illumination light;
   an illumination optical system which includes an optical element and is adapted to irradiate the image display element with the illumination light;
   a projection optical system for projecting the illumination light modulated by the image display element onto a projection surface, the projection optical system including:
      a projection variable-aperture diaphragm having an aperture whose aperture diameter is variable;
   an illumination optical system changing mechanism for changing a position or a configuration of the optical element depending on the aperture diameter of the projection variable-aperture diaphragm.

* * * * *